US012783273B2

(12) United States Patent
Lerzer et al.

(10) Patent No.: US 12,783,273 B2
(45) Date of Patent: Nov. 3, 2026

(54) CONTROLLER FOR A USER INTERFACE OF A MOTOR VEHICLE, AND METHOD FOR OPERATING A CONTROLLER FOR A USER INTERFACE

(71) Applicant: AUDI AG, Ingolstadt (DE)

(72) Inventors: Jürgen Lerzer, Neumarkt (DE); Hans Georg Gruber, Ingolstadt (DE); Jan Meletzky, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 941 days.

(21) Appl. No.: 17/996,405

(22) PCT Filed: Apr. 15, 2021

(86) PCT No.: PCT/EP2021/059731
§ 371 (c)(1),
(2) Date: May 19, 2023

(87) PCT Pub. No.: WO2021/213874
PCT Pub. Date: Oct. 28, 2021

(65) Prior Publication Data

US 2023/0305879 A1 Sep. 28, 2023

(30) Foreign Application Priority Data

Apr. 22, 2020 (DE) ..................... 10 2020 110 970.9

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01)

(58) Field of Classification Search
CPC ......... G06F 9/45558; G06F 2009/4557; G06F 2009/45583
See application file for complete search history.

(56) References Cited

U.S. PATENT DOCUMENTS 10,819,566 B2 * 10/2020 Chew .................. H04L 41/0661
2004/0255111 A1 12/2004 Lim
(Continued)

FOREIGN PATENT DOCUMENTS

CN 104679556 A 6/2015
CN 107783821 A 3/2018
(Continued)

OTHER PUBLICATIONS

International Search Report of the International Searching Authority directed to related International Patent Application No. PCT/EP2021/059731, mailed Jul. 16, 2021, with attached English-language translation; 5 pages.
(Continued)

*Primary Examiner* — Lewis A Bullock, Jr.
*Assistant Examiner* — Kevin X Lu
(74) *Attorney, Agent, or Firm* — Sterne, Kessler, Goldstein Fox & P.L.L.C.

(57) ABSTRACT

A control unit for a user interface of a motor vehicle comprising a system on a chip having a main processor and a flash memory arrangement that can be used by the system on a chip, wherein the system on a chip comprises a hypervisor that implements a first virtual machine and a second virtual machine. The first virtual machine is configured to execute a first function, associated with a driving operation of the motor vehicle. The second virtual machine is configured to execute a second function, the second function being an infotainment function for the user, wherein at least one of an availability requirement, a safety requirement, a robustness requirement, or a drive readiness requirement for the first function is higher than the second function. A flash memory arrangement has two independently functional flash memory units forming their own memory areas, wherein a first flash memory unit comprises
(Continued)

Figure 1:
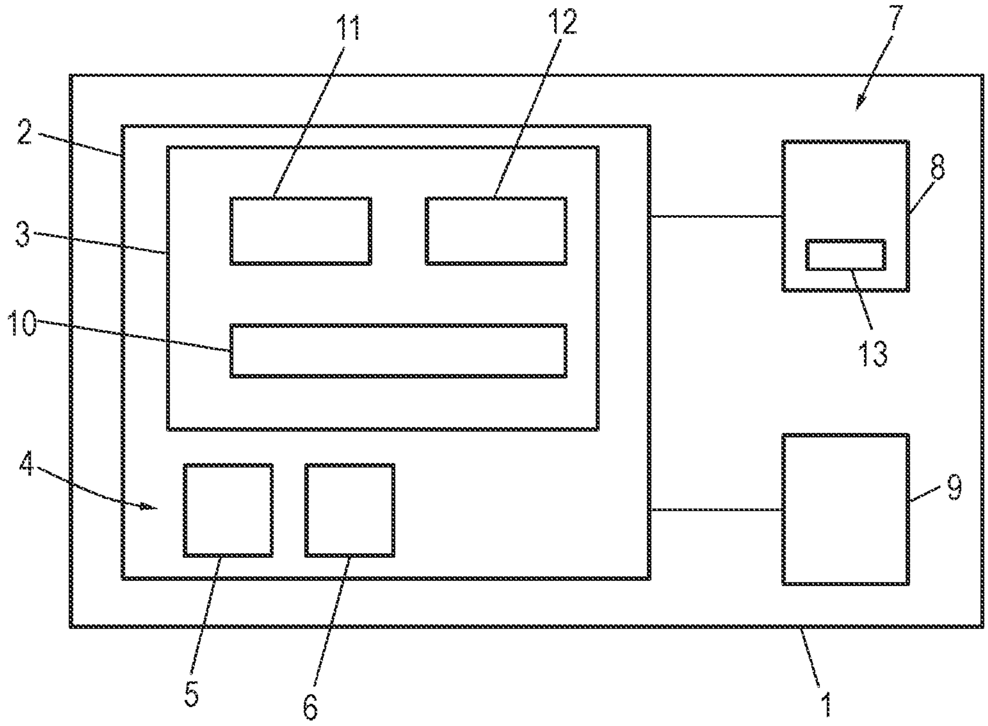

data required for starting up the control unit, using a bootloader, on the first flash memory unit, a software program that implements the hypervisor, a software program of the first virtual machine, as well as infrastructure software, including an operating system and a framework of the operating system, of the second virtual machine. A second flash memory unit comprises an application software program for realizing the second functions of the second virtual machine.

16 Claims, 1 Drawing Sheet

(56) References Cited

U.S. PATENT DOCUMENTS

| | | | | |
|---|---|---|---|---|
| 2014/0365120 | A1* | 12/2014 | Vulcano | G01C 21/362 701/532 |
| 2016/0328254 | A1* | 11/2016 | Ahmed | G06F 9/45545 |
| 2017/0039084 | A1 | 2/2017 | Atsmon et al. | |
| 2019/0121540 | A1* | 4/2019 | Shin | G06F 13/126 |
| 2019/0361736 | A1 | 11/2019 | Poledna et al. | |
| 2020/0185922 | A1* | 6/2020 | Hinterberger | B60L 53/53 |
| 2020/0236533 | A1* | 7/2020 | Wane | G06F 9/45533 |
| 2024/0427725 | A1* | 12/2024 | Nie | G06F 13/105 |

FOREIGN PATENT DOCUMENTS

| | | | |
|---|---|---|---|
| CN | 110531733 | A | 12/2019 |
| DE | 102011122344 | A1 | 6/2013 |
| DE | 102012205301 | A1 | 10/2013 |

OTHER PUBLICATIONS

International Preliminary Report on Patentability directed to related International Patent Application No. PCT/EP2021/059731, completed Jul. 26, 2022, with attached English-language translation; 17 pages.

Chinese Application No. 202180028178.5, Office Action mailed Feb. 9, 2026; with attached English Translation from EPO Global Dossier, 19 pages.

* cited by examiner

CONTROLLER FOR A USER INTERFACE OF A MOTOR VEHICLE, AND METHOD FOR OPERATING A CONTROLLER FOR A USER INTERFACE

TECHNICAL FIELD

The present disclosure relates to a control unit for a user interface of a motor vehicle, comprising a system on a chip having at least one main processor and a flash memory arrangement that can be used by the system on a chip, wherein the system on a chip comprises a hypervisor that implements a first virtual machine and a second virtual machine, wherein the first virtual machine is designed to execute at least one first function, which is relevant in particular to the driving operation of the motor vehicle, and the second machine is designed to execute at least one second function, in particular an infotainment function for the user, wherein at least one availability requirement and/or safety requirement and/or robustness requirement and/or drive readiness requirement for the at least one first function is higher than for the at least one second function. In addition, the present disclosure relates to a motor vehicle and a method for operating a control unit for a user interface of a motor vehicle.

BACKGROUND

In modern motor vehicles, specifically their control architectures, it is increasingly planned to integrate a large amount of functionalities into individual control units, i.e., vehicle computers, which are also known as "high performance computing platforms" (HCP). On the one hand, cost advantages are achieved by using synergies and sharing resources; on the other hand, flexibility is thus increased. With regard to the interaction with occupants, in particular the driver, of the motor vehicle, i.e., the user interface, it was proposed in particular to use a common cockpit HCP as the control unit for the user interface, which on the one hand provides infotainment/entertainment functionalities, but on the other hand also provides functions that support driving the motor vehicle itself by generating corresponding driving-related content/warning displays, which can then be output, for example, in an electronic instrument cluster and/or on a head-up display and/or via an audio system of the motor vehicle. Functions of such a control unit that are relevant for driving, in particular for the motor vehicle to be generally ready to drive, further comprise functions related to a reversing camera, the operation of an air conditioning system, and the like. Such a control unit for a user interface of a motor vehicle can therefore also be referred to overall as a user input/output control unit in addition to the term cockpit HCP or cockpit control unit.

However, this approach means that functions are integrated into a common cockpit control unit that have extremely conflicting requirements in terms of the robustness, safety and readiness of the motor vehicle to drive. While the robustness and safety requirements are lower for the infotainment functions, they are extremely high for the driving and motor vehicle related functions. Accordingly, infotainment/entertainment functionalities are not necessary for the motor vehicle to be ready to drive, while there is a specific set of functions in the domain related to driving operation and the motor vehicle that is indispensable for the motor vehicle to be ready to drive. In addition, in the case of such an integration into a common control unit, the problem arises that, for example due to the use of open operating systems such as "Android Automotive" for the implementation of infotainment functions, the probability that an error will occur in the infotainment/entertainment area is significantly higher than with regard to the functions related to driving and the motor vehicle.

To realize such a common cockpit HCP, i.e., a control unit for the user interface, it has already been proposed to use a hypervisor that implements two virtual machines, namely a first virtual machine (SYS_Partition) for functions with requirements in terms of early availability, robustness, safety, and for the motor vehicle to be ready to drive, and a second virtual machine (IVI_Partition), which provides the second functions related to the infotainment (comprising entertainment). As is known, the hypervisor provides the virtualization of shared hardware resources for the two virtual machines, comprising access to the storage means, which is usually provided as a flash memory device.

A special problem in this context arises from the use of open infotainment or entertainment operating systems, such as "Android Automotive." The probability that the connected flash memory device, usually UFS, eMMC, or SSD, will be damaged is significantly higher compared to a conventional infotainment or entertainment system, after, for example, third-party application software is to be provided and used for which flash memory access cannot be controlled. Furthermore, for example, the "Android Automotive" platform itself requires a higher number of write processes in the flash memory than a conventional infotainment or entertainment system.

In addition, more and more applications are to be integrated into modern infotainment or entertainment systems in motor vehicles, which also require a higher amount of flash memory access than conventional applications. Such use cases comprise, for example, music and video streaming, online navigation applications, use of dashboard cameras, and the like. Furthermore, with open operating systems, there is always the risk that a malicious application will get into the infotainment or entertainment system, which will generate a particularly large number of flash memory accesses, in particular delete and write accesses, in order to destroy the control unit.

In an example with a 128 GBUFS flash memory device, 1000 erase/write cycles, and a daily amount of 30 GB of write accesses, this would result in an estimated average service life of 12 years, which leaves too little scope to cover the service life of a motor vehicle, in particular 10 to 15 years, in particular with regard to the functions in the domain related to driving and the motor vehicle itself.

For example, on the stress placed on flash memory devices by software applications, see the article by Tao Zang et al., "Apps can quickly destroy your mobile's flash: Why they don't, and how to keep it that way," MobiSys 2019, Seoul, Korea. Session 4: Taming your apps.

Approaches have already been proposed in the prior art to extend the service life of flash memories. One of these approaches, which was taken into account in the calculation example described above, is what is known as "flash wear leveling." Wear leveling is a technique for extending the service life of various erasable storage devices, in particular flash memory. The idea in this case is to arrange data in such a way that processes of erasing and rewriting are evenly distributed over the entire medium.

Another conceivable approach to extending the service life of flash memory devices is the use of SLC ("single level cell") technology, i.e., memory cells in which only one bit is stored. This is in contrast to current high integration techniques, which typically use MLC ("MultiLevel Cell," two bits per memory cell) or TLC ("TripleLevel Cell," three bits per memory cell). The use of SLC technology would result in a significantly higher resilience and would probably eliminate the service life problems discussed in motor vehicles but is currently not being considered since significantly higher costs arise due to the lower data density.

It would further be conceivable to use SD cards as additional storage media. However, the addition of an SD card slot in the motor vehicle would incur additional costs and requires a special installation space. In addition, the memory access times for SD cards are significantly lower than for embedded flash memory.

It has further been proposed to use an access monitor to monitor memory accesses to flash memory in order to be able to provide the user with control interventions and/or notifications if necessary. However, it has been shown that such a monitoring activity alone does not adequately prevent flash memory wear and tear, so that failures can still occur in control units for user interfaces in motor vehicles during the service life of the motor vehicle.

WO 2015/103 376 A1 discloses a vehicle with multiple user interface operating domains. The publication discloses a computer system for integration with a user interface of a vehicle, which has a calculation system with at least one multi-core processor. The calculation system is set up to provide virtualization for a first guest operating system and for a second guest operating system. The first guest operating system is configured for high-reliability operation, and the virtualization prevents actions of the second guest operating system from affecting the high-reliability operation of the first guest operating system.

US 2017/0 021 839 A1 discloses methods and systems for algorithmic control of automotive functions. The system there comprises a multi-core system on a chip with a hypervisor that provides a multi-core synchronization function for a plurality of cores on the system on a chip.

US 2017/0 039 084 A1 relates to an advanced driver assistance system (ADAS) as a system on a chip. A hypervisor can provide different virtual machines, which can comprise, for example, an ADAS server, a virtual machine for at least safety-critical ADAS functions, and a virtual machine for non-critical safety functions.

DE 10 2011 122 344 A1 relates to a method for managing data in a flash memory of a driver assistance device of a motor vehicle. The flash memory comprises at least a first and a second memory sector in which the data is stored. The data comprises critical data, the absence of which results in failure of the driver assistance device, and non-critical data, with all critical data being stored in at least one of the memory sectors.

BRIEF DESCRIPTION OF DRAWINGS/FIGURES

Figure 2:
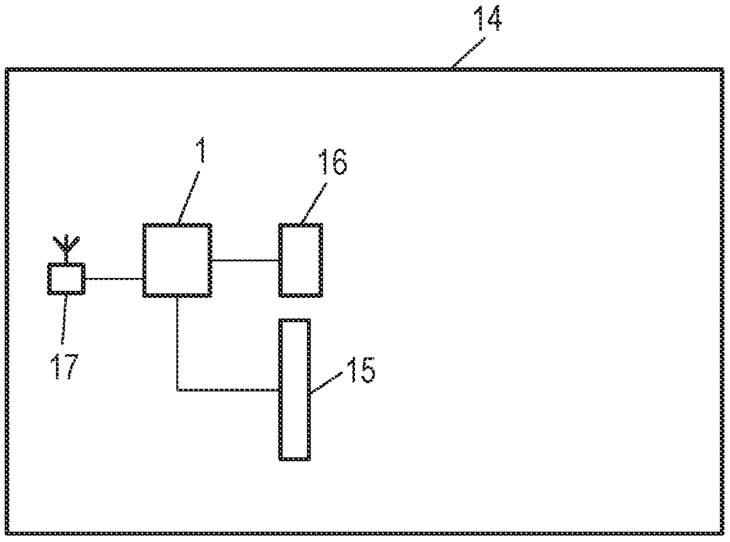

Further advantages and details of the present disclosure will become apparent from the embodiments described below and with reference to the drawings, in which:

FIG. 1 shows the architecture of a control unit according to the present disclosure, and FIG. 2 shows a schematic diagram of a motor vehicle according to the present disclosure.

DETAILED DESCRIPTION

The present disclosure is based on the object of allowing a possibility for the integration of driving-related functions and infotainment functions on a common hypervisor-based system with shared flash access, which ensures the availability of the driving-related and motor vehicle-related functions over the service life of the motor vehicle.

In order to solve this problem, in a control unit of the type mentioned at the outset, it is provided according to the present disclosure that the flash memory arrangement has at least two independently functioning flash memory units forming their own memory areas, wherein a first of the flash memory units comprises all of the data required for starting up the control unit (in particular a bootloader) on the first flash memory unit, but also the software means that implements the hypervisor, all of the software means of the first virtual machine (which implement the first functions), as well as the infrastructure software, in particular the operating system and a framework of the operating system, of the second virtual machine, while the second flash memory unit contains application software means of the second virtual machine, which realize the second functions.

According to the present disclosure, a control system is thus proposed, specifically a split cockpit/infotainment control system, which has a system on a chip (SoC) and two flash memory units of a flash memory arrangement, which are each connected to the system on a chip. The system on a chip comprises a hypervisor, for example as firmware, which creates and operates virtual machines and virtualizes the system on a chip resources, for example the main processor (main CPU), I/Os, etc. Furthermore, the virtualization of the first and the second flash memory unit with regard to the virtual machines is further controlled by the hypervisor.

By providing a first flash memory unit and a second flash memory unit, memory sections that can be addressed independently are created, which are also independent of one another in terms of their operation, so that a long-lasting flash memory unit can be created for the control unit through targeted distribution of the necessary memory information, which is sufficient for the control unit to continue to operate, and to provide a flash memory unit that is at risk of premature failure, but which then does not impair the functionality of the control unit as a whole. It is therefore proposed to store not only all of the data required for starting up the control unit, in particular a bootloader, on the first flash memory unit, but also the software means that implements the hypervisor, all of the software of the first virtual machine, as well as the infrastructure software, in particular the operating system and a framework of the operating system, of the second virtual machine. This not only ensures that booting is possible, the hypervisor is active, and the two virtual machines are provided, but also that all the first functions of the first virtual machine, which are particularly relevant to the driving operation of the motor vehicle and need to meet correspondingly high availability requirements/safety requirements/robustness requirements/drivability requirements with certainty, while the application software means of the second virtual machine that heavily require flash memory, as well as the data required by them, are provided on the second flash memory unit. This means that the second flash memory unit can be used and claimed as desired, since its failure only affects comfort functions, in particular of infotainment; the generally necessary operation of the motor vehicle, in particular the functions relevant to driving, without which the motor vehicle is, in particular, not ready to drive, remain however available via the first flash memory unit. Therefore, the division of information to be stored is selected such that the control unit is bootable and operable both with and without the availability of the second flash memory unit.

The present disclosure therefore makes it possible in particular to allow the execution of second functions that meet lower requirements, which are implemented by the application software means of the second virtual machine in the second flash memory unit, but which stress the flash memory significantly more, without impairing the first functions that make higher demands, in particular those that are relevant or necessary for the operation of the motor vehicle, or expose their flash memory unit to a greater risk of suffering a failure. In particular, infotainment functions comprising information functions and entertainment functions can be run on open application platforms such as "Android Automotive" in parallel with functions that are assigned to driving the motor vehicle on the same calculation platform without affecting the service life of the first functions related to driving the motor vehicle even if it cannot be avoided that the flash memory for the infotainment functions (second functions) fails much earlier, for example due to the behavior of third-party applications, due to the nature of certain use cases, and/or due to the malfunction of malicious applications.

An expedient development of the present disclosure provides that the motor vehicle in which the control unit according to the present disclosure is installed is assigned a different, longer warranty period for the functions in the first flash memory unit than for the, in particular complete, second functions in the second flash memory unit. For example, the warranty period for the functions in the first flash memory unit can correspond to the warranty period of the entire motor vehicle, and the warranty period for the functions in the second flash memory unit can be shorter, for example corresponding to the expected service life of the second flash memory unit. Therefore, the present disclosure allows a marketing variant for motor vehicles in which an infotainment platform is sold with a shorter warranty period than other vehicle functions. In this context, it should be noted that, when using "Android Automotive" for the second virtual machine, even if this operating system and its application software means do not cause a failure in the second flash memory unit, the service life of "Android Automotive" inside a motor vehicle may be limited since Android only offers hardware support for a few years.

In this context, it should also be pointed out that Linux and/or QNX, for example, can be used as the operating system for the first virtual machine. In general, infotainment should further relate to entertainment and/or the provision of information within the scope of the present disclosure.

In a specific embodiment of the present disclosure, it can be provided that the flash memory units are implemented as separate flash memory modules. In this case, there are two separate structural units, each of which can comprise its own controller and its own memory area. It should be noted in general that it is entirely conceivable within the scope of the present disclosure to design the flash memory arrangement and the system on a chip in an integrated manner, but also to provide other embodiments with corresponding connections between the system on a chip and the flash memory units (which are then present separately). The use of separate flash memory modules has the advantage that ultimately generally available, already existing modules can be used.

In a development of the present disclosure, however, it is also conceivable for both flash memory units of the flash memory arrangement to be implemented in a single flash memory module or a single flash memory component, wherein the first flash memory unit and the second flash memory unit comprise a first flash memory zone and a second flash memory zone in one flash memory module, wherein in particular two memory controllers, one for each flash memory zone, are provided in order to implement the mutually independent flash memory units. In particular, two independent flash wear leveling zones can also be implemented, one for the first flash memory zone and one for the second flash memory zone.

The flash memory units of the flash memory arrangement can generally be in basically known embodiments or standards, so that it can be provided in particular that the flash memory units are available in Universal Flash Storage format (UFS format) and/or as Solid State Disk (SSD) and/or as embedded multimedia card (eMMC).

Systems on a chip often also have additional hardware modules (in addition to the main processor (main CPU)), in particular when used in motor vehicles, for example digital signal processors (DSP), graphics processors (GPU), and the like. In order to ensure complete operation of the system on a chip and thus the control unit even if the second flash memory unit fails, an expedient development of the present disclosure provides that the first flash memory unit additionally contains at least one software means for operating at least one additional hardware component of the system on a chip, in particular for a digital signal processor and/or a GPU. Such additional hardware modules are often also referred to as "IPs." The corresponding software means can be designed at least in part to run on the at least one additional hardware module. In this way, the operability of the system on a chip is ensured even without the second flash memory unit.

In an advantageous development of the present disclosure, it can be provided that the system on a chip is designed, in particular during a boot process, to detect the availability of the second flash memory unit and to carry out at least one measure in the event of non-availability. Such a detection of the unavailability of the second flash memory unit is useful on the one hand in that future delays in the boot process if the second flash memory unit is searched for again can be avoided and trouble-free operation of the control unit can be ensured after no further attempts to access the second flash memory unit are made. Accordingly, measures can comprise future skipping of the availability detection when booting and/or reconfiguring the second virtual machine. Furthermore, a measure can further comprise outputting a notice to a user. This ensures stable, lag-free operation.

As already mentioned, the second functions generally comprise, at least in part, those whose operation causes the flash memory used to wear out more than the first functions and possibly other second functions. In particular, application software means, which are then usually referred to as OEM software or OEM applications, can already be provided by the manufacturer, i.e., by the manufacturer of the motor vehicle, for which a correspondingly high wear of the flash memory is prevented. This means that such second functions can in principle also be implemented via the first flash memory unit, which gives the manufacturer the flexibility to also store specific OEM functionalities of the second virtual machine as application software on the first flash memory unit and thus to keep them available even if the second flash memory unit fails. Alternatively, it is also conceivable to store such special application software means and thus specific second functions on the first flash memory unit only if the second flash memory unit fails and thus make them available.

A particularly advantageous embodiment of the present disclosure accordingly provides that at least one basic software means provided by the manufacturer for the second virtual machine is additionally stored in the first flash memory unit and/or a memory space is reserved for the basic software means. In the latter case, the basic software means is initially provided in the second flash memory unit and is operated there. Therefore, a specific basic equipment of OEM applications, namely the at least one basic software means, remains available even if the second flash memory unit fails, so that in particular specific infotainment functions that are part of the basic equipment of a motor vehicle continue to be able to be used by a user of the motor vehicle.

Accordingly, the at least one basic software means can be selected from the group comprising a radio application for receiving (and playing) radio stations, a media playback function, and a projection mode function for at least one connectable mobile device. Application software means for second functions, which may be present in the case of infotainment use of the second virtual machine on the second flash memory unit reserved for the latter, then comprise, for example, a navigation application, a streaming application, a weather service, a news service, and/or a telephone service (telephony application). A telephony application can also be used as a basic software means if necessary. Other second functions that should only be used via the second flash memory unit are third-party software means that are first installed, for example, by a user of the motor vehicle.

The use of a projection mode function as a basic software means is to be rated as particularly advantageous. In a projection mode, known for example as "Apple Car Play" and "Android Auto," application software means ("apps") running on a coupled mobile device, for example in a smartphone, can provide a user interface on the user interface of the motor vehicle, so that information from the voice application software means can be displayed via a display device of the motor vehicle and/or user inputs can be accepted via input means of the motor vehicle. If the second flash memory unit fails, a projection mode that is still provided as a basic software means enables a kind of fallback solution for the user, who can now continue to implement further infotainment functions, in particular second functions that are now missing in the motor vehicle, for example via the connected mobile device and thus at least a partial replacement is made possible.

It should also be noted at this point that, as already explained at the outset, the first functions can be aimed, for example, at the operation or user-side control of vehicle functions and/or the display of status information on the motor vehicle and/or motor vehicle functions relating to driving operation. For example, first functions may relate to the operation of an instrument panel/dashboard, an electronic instrument cluster, the output of warning messages, the use of a reversing camera and/or the operation of an air conditioning system.

In a particularly advantageous development of the present disclosure, when memory space is reserved for the basic software means and the system on a chip is configured to detect the availability of the second flash memory unit, it can be provided that the system on a chip is configured to store the basic software means in the reserved memory space when the second flash memory unit is not available for the at least one basic software means. This means that the at least one basic software means is stored in the reserved memory space whenever it is determined, in particular when the control unit is started up, that the second flash memory unit is not available. At the same time, if necessary, the second virtual machine can be reconfigured in such a way that the basic software means can also be found at its new storage location.

In this context, it is particularly expedient if the reserved memory space can nevertheless be used sensibly as long as it is not required for the at least one basic software means. A particularly advantageous, specific development of the present disclosure can provide that the system on a chip is designed for using the reserved memory space for a database provided by the manufacturer that is to be overwritten if necessary, in particular by a software means of the second virtual machine that is stored on the second flash memory unit. Therefore, the reserved memory space (reserved headroom) can optionally be overlaid with other content on the first flash memory unit, for example with manufacturer-controlled databases, for example navigation databases and/or speech output databases, which are used by OEM software resources that do not belong to the at least one basic software means and provided on the second flash memory unit. With the elimination of the second flash memory unit, these databases are also no longer required on the first flash memory unit, so that they can be easily overwritten by the at least one basic software means. In this way, continuous use of the available memory space is made possible without the risk of excessive wear of the first flash memory unit, since the reserved storage space is used for data that is not very heavy on the flash memory.

The system on a chip can further be designed to automatically call up the at least one basic software means via a wireless interface, in particular a mobile radio interface, of the motor vehicle. For example, a manufacturer-side backend computing device, for example a server available on the Internet, can then be accessed via a mobile network, so that the at least one basic software means can be stored in the first flash memory unit during normal driving operation of the motor vehicle. Alternatively, of course, other embodiments are also conceivable, for example storing via a diagnosis or workshop access, for example when visiting a workshop.

In an expedient development, the first flash memory unit can further contain software means for at least one diagnostic function and/or at least one configuration function and/or a database provided by the manufacturer and/or a trusted execution environment (TEE/Trust OS). In this way, the control unit, for example when connected to a diagnostic connection, can also provide functionalities that relate to the configuration or diagnosis of the motor vehicle, for example at the end of the assembly line or later when visiting a workshop. Databases provided by the manufacturer (OEM databases) have already been mentioned and can, for example, comprise a navigation database and/or a voice output database and can particularly preferably be stored in the reserved memory space described.

In a particularly preferred embodiment of the present, the system on a chip can be designed for applying flash wear leveling to the flash memory arrangement. In this way, a further, established option for extending the service life is added by making the write and delete accesses as uniform as possible.

In addition to the control unit, the present disclosure also relates to a motor vehicle comprising at least one control unit according to the disclosure. In particular, the control unit is then a so-called cockpit control unit, which provides first functions related to driving operation in the form of the first virtual machine and infotainment functions as second functions in the form of the second virtual machine. All embodiments relating to the control unit according to the disclosure can be analogously transferred to the motor vehicle according to the disclosure, with which the already mentioned advantages can thus also be obtained.

Finally, the present disclosure also relates to a method for operating a control unit for a user interface of a motor vehicle, wherein the control unit comprises a system on a chip having at least one main processor and a flash memory arrangement that can be used by the system on a chip, wherein the system on a chip comprises a hypervisor that implements a first virtual machine and a second virtual machine, wherein the first virtual machine is designed to execute at least one first function, which is relevant in particular to the driving operation of the motor vehicle, and the second machine is designed to execute at least one second function, in particular an infotainment function for the user, wherein, in particular, at least one availability requirement and/or safety requirement and/or robustness requirement and/or drive readiness requirement for the at least one first function is higher than for the at least one second function, characterized in that the flash memory arrangement has at least two independently functional flash memory units forming their own memory areas, wherein a first of the flash memory units is used for all of the data required for starting up the control unit, in particular a bootloader, on the first flash memory unit, but further for the software means that implements the hypervisor, for all of the software means of the first virtual machine, as well as for the infrastructure software, in particular the operating system and a framework of the operating system, of the second virtual machine while the second flash memory unit is used for application software means of the second virtual machine. All statements regarding the control unit according to the present disclosure and the motor vehicle according to the present disclosure can also be transferred to the method according to the present disclosure, so that the advantages already mentioned can also be obtained with this.

It should also be noted at this point that, for example, when using "Android Automotive" or other Unix-based operating systems, the infrastructure software for the second virtual machine comprises, for example, a kernel and an associated framework, which provides additional services, in particular related to graphics and/or audio.

FIG. 1 shows the architecture of a control unit 1 according to the present disclosure for a user interface of a motor vehicle, which can also be referred to as a cockpit HCP. The control unit 1 comprises a system on a chip 2 which comprises a main processor 3 (main CPU) in the present case. The system on a chip can further comprise additional hardware modules 4, for example a digital signal processor 5 and a GPU 6.

The control unit 1 further comprises a flash memory arrangement 7 which has a first flash memory unit 8 and a second flash memory unit 9. The flash memory units 8, 9 are each connected to the system on a chip 2. In the embodiment shown, the flash memory units 8, 9 are both provided as separate flash memory modules, i.e., separate structural units; however, it is also conceivable to use a single flash memory module with two flash memory zones that are independent of one another.

During operation, the resources of the system on a chip 2 and the flash memory arrangement 7 are managed and virtualized by a hypervisor 10, in this case for the implementation of a first virtual machine 11 and a second virtual machine 12. The first virtual machine 11 performs first functions that are relevant to the driving operation of the motor vehicle, for example the control operations of an electronic instrument cluster, the output of warnings, and the like. In particular, at least some of the first functions must be available for the motor vehicle to be ready to drive. These first functions, i.e., classic functionalities of a cockpit control unit, have high requirements in terms of early availability, robustness, and safety and are at least partially necessary for the motor vehicle to be ready to drive.

The second virtual machine 12, on the other hand, performs infotainment functions, i.e., functions related to information output and/or entertainment, as second functions. These second functions have significantly lower requirements in terms of early availability, robustness, and safety. They are not required for the motor vehicle to be ready to drive. However, the second functions, in particular as third-party software means and/or when using open operating systems, can comprise a significantly larger number of accesses to the flash memory, in particular delete and write accesses. This means that the flash memory is worn out significantly more by at least part of the second functions compared to the first functions. This is also due in particular to the fact that the second virtual machine 12 offers the user the option of installing application software means himself, for example problematic third-party software means in addition to OEM software means provided by the manufacturer.

Nevertheless, the control unit according to the present disclosure allows the first and second functions to be used jointly, wherein the first functions (and some second functions provided by basic software means) can be provided with a significantly longer service life and thus warranty period than problematic second functions. The division of the flash memory arrangement 7 into the flash memory units 8, 9 that can be operated independently of one another is used accordingly for this purpose.

In the present case, the following elements are stored in the first flash memory unit 8: a boot loader, software means for the hypervisor 10 (in particular comprising firmware), software means (in particular also comprising firmware) for operating the additional hardware modules 4, all software means of the first virtual machine 11, infrastructure software means of the second virtual machine 12 (here in particular a kernel and a framework of the operating system), as well as in a specially reserved memory space 13, which will be explained in more detail, databases provided by the manufacturer, presently comprising a navigation database and a speech output database. All application software means, comprising application software means provided by the manufacturer (OEM software) and third-party software means, and therefore all application software means that implement the second functions, are stored in the second flash memory unit 9.

In the present case, second functions (navigation system and possibly media-related software), which are stored in the second flash memory unit 9, access the aforementioned databases provided by the manufacturer in the reserved memory space 13.

Due to the application software means in the flash memory unit 9 that are not relevant for the basic functions of the control unit 1, the control unit 1, in particular the system on a chip 2, can therefore boot and run both with and without the availability of the second flash memory unit 9. In the present case, however, the system on a chip 2 is also designed to detect the availability of the second flash memory unit 9 during the boot process. If it is determined that the second flash memory unit 9 is no longer available, for example due to a failure, for example due to a too-long excessive load from at least some of the second functions, various measures are taken in the present case. On the one hand, the second flash memory unit 9 is marked as no longer available, so that in the future there will no longer be any corresponding detections that could slow down the boot process. Furthermore, a message is output to a user, which describes in particular a restriction of the infotainment functions. Finally, however, a plurality of basic software means for the second virtual machine 12 are loaded into the reserved memory space 13 when the unavailability of the second flash memory unit 9 is determined, in the present case wirelessly via a mobile radio network, i.e., "over the air." In the present case, these basic software means comprise a projection mode function, a radio application for receiving radio stations, and a media playback function. The projection mode function can be used to implement a projection mode for at least one mobile device, for example a smartphone, that can be coupled, which makes it possible to operate an "app" on the coupled mobile device via the user interface of the motor vehicle, for example as a replacement for the second functions that have been omitted. Therefore, the databases provided by the manufacturer that are now no longer required are overwritten in the reserved memory space 13 of the first flash memory unit 8 with the basic software means.

It should be noted at this point that embodiments of the present disclosure are also conceivable in which the at least one basic software means is already stored in the first flash memory unit 8, i.e., is permanently provided there, while the remaining application software means for implementing the second function are stored in the second flash memory unit 9.

The flash memory units 8, 9 can be in UFS format, as an SSD and/or eMMC. Furthermore, within the scope of the present disclosure, it can optionally further be provided that software means for at least one diagnostic function and/or at least one configuration function and/or a trusted execution environment are further stored in the first flash memory unit 8.

In any case, i.e., also in this embodiment, the system on a chip 2 is designed for the application of flash wear leveling to the flash memory arrangement 7, and consequently to each of the flash memory units 8, 9. This means that, by appropriately controlling the flash memory units 8, 9, the individual memory cells are used evenly, as far as this is possible.

FIG. 2 finally shows a schematic diagram of a motor vehicle 14 according to the present disclosure. In the present case, this comprises an electronic instrument cluster 15 as part of a user interface and an operating device 16 provided in the region of the center console, in particular comprising a touch screen, wherein both input/output means 15, 16 can be used both for functions relevant to driving operation (first functions) and for infotainment functions (second functions). The motor vehicle 14 has a control unit 1 according to the present disclosure for controlling at least this user interface. This control unit is also connected to a mobile radio interface 17 of the motor vehicle 14 in order not only to be able to call up a wide variety of data, for example streaming data for second functions and the like, in particular from the Internet, but also to be able to download the basic software if the second flash memory unit 9 fails for the second virtual machine 12 and to be able to store it in the reserved memory space 13.

The invention claimed is:

1. A control unit for a user interface of a motor vehicle, the control unit comprising:

a system on a chip having a main processor, wherein the system on a chip comprises:

a first virtual machine implemented by a hypervisor, wherein the first virtual machine is configured to execute a first function associated with a driving operation of the motor vehicle; and a second virtual machine implemented by the hypervisor, wherein the second virtual machine is configured to execute a second function, the second function being an infotainment function, wherein at least one of an availability requirement, a safety requirement, a robustness requirement, or a drive readiness requirement for the first function is higher than a corresponding requirement for the second function; and a flash memory arrangement configured for use by the system on a chip, the flash memory arrangement comprising:

a first flash memory unit comprising:

data required for starting up the control unit using a bootloader, software programs configured to implement the hypervisor and the first virtual machine, and infrastructure software programs including an operating system and a framework of the operating system of the second virtual machine; and a second flash memory unit comprising an application software program configured to realize the second function of the second virtual machine, wherein the first flash memory unit and the second flash memory unit are independently functional flash memory units having their own memory areas, and wherein the control unit is configured to detect, during a boot process. availability of the second flash memory unit, and to carry out a measure in an event of un-availability of the second memory flash unit, and wherein the measure comprises downloading a basic software program for the second virtual machine into a reserved memory space within the first flash memory unit through a mobile radio interface of the motor vehicle.

2. The control unit of claim 1, wherein the first flash memory unit and the second flash memory unit are implemented as separate flash memory modules, wherein the first flash memory unit and the second flash memory unit are separate structural units.

3. The control unit of claim 1, wherein the first flash memory unit and the second flash memory unit are provided in universal flash storage format, as a solid state disk or as an embedded multimedia card.

4. The control unit of claim 1, wherein the first flash memory unit further comprises a software program for operating a hardware component of the system on a chip.

5. The control unit of claim 4, wherein the hardware component is at least one of a digital signal processor or a graphics processing unit (GPU).

6. The control unit of claim 1, wherein the basic software program provided by a manufacturer for the second virtual machine is additionally stored in at least one of the first flash memory unit or the second flash memory unit.

7. The control unit of claim 6, wherein the system on a chip is configured to use the reserved memory space for a database provided by the manufacturer and configured to be overwritten with the basic software program.

8. The control unit of claim 1, wherein a memory space of the first flash memory unit is reserved for the basic software program to facilitate availability of the basic software program, should the second flash memory unit fail.

9. The control unit of claim 8, wherein the system on a chip is configured to store the basic software program in the reserved memory space when the second flash memory unit is not available based on a detection of un-availability of the second flash memory unit by the system on a chip.

10. The control unit of claim 9, wherein the system on a chip is configured to automatically download the basic software program via the mobile radio interface of the motor vehicle.

11. The control unit of claim 1, wherein the basic software program is configured as one of a radio application for receiving radio stations, a media playback function, or a projection mode function for a connectable mobile device.

12. The control unit of claim 1, wherein the first flash memory unit further comprises a software program configured as at least one of a diagnostic function, a configuration function, a database provided by the manufacturer, or a trusted execution environment.

13. The control unit of claim 1, wherein the system on a chip is configured to apply flash wear leveling to the flash memory arrangement.

14. The control unit of claim 1, wherein the first flash memory unit is implemented in a first flash memory zone and the second flash memory unit is implemented in a second flash memory zone which are implemented in a single flash memory module.

15. A motor vehicle, comprising a control unit configured as a user interface, wherein the control unit comprises:

a system on a chip having a main processor, wherein the system on a chip comprises:

a first virtual machine implemented by a hypervisor, wherein the first virtual machine is configured to execute a first function associated with a driving operation of the motor vehicle; and a second virtual machine implemented by the hypervisor, wherein the second virtual machine is configured to execute a second function, the second function being an infotainment function, wherein at least one of an availability requirement, a safety requirement, a robustness requirement, or a drive readiness requirement for the first function is higher than a corresponding requirement for the second function; and a flash memory arrangement configured for use by the system on a chip, the flash memory arrangement comprising:

a first flash memory unit comprising:

data required for starting up the control unit using a bootloader, software programs configured to implement the hypervisor and the first virtual machine, and infrastructure software programs including an operating system and a framework of the operating system of the second virtual machine; and a second flash memory unit comprising an application software program configured to realize the second function of the second virtual machine, wherein the first flash memory unit and the second flash memory unit are independently functional flash memory units having their own memory areas, and wherein the control unit is configured to detect, during a boot process, availability of the second flash memory unit, and to carry out a measure in an event of un-availability of the second memory flash unit, and wherein the measure comprises downloading a basic software program for the second virtual machine into a reserved memory space within the first flash memory unit through a mobile radio interface of the motor vehicle.

16. A method for operating a control unit for a user interface of a motor vehicle, the control unit comprising a system on a chip having a main processor, and a flash memory arrangement configured for use by the system on a chip, the system on a chip comprising a hypervisor configured to implement a first virtual machine and a second virtual machine, the method comprising:

executing, by the first virtual machine, a first function associated with a driving operation of the motor vehicle;

executing, by the second virtual machine, a second function, the second function being an infotainment function, wherein at least one of an availability requirement, a safety requirement, a robustness requirement, or a drive readiness requirement for the first function is higher than a corresponding requirement for the second function;

implementing the flash memory arrangement, wherein the flash memory arrangement comprises:

a first flash memory unit comprising:

data required for starting up the control unit using a bootloader, software programs configured to implement the hypervisor and the first virtual machine, and infrastructure software programs including an operating system and a framework of the operating system of the second virtual machine; and a second flash memory unit comprising an application software program configured to realize the second function of the second virtual machine; and detecting, during a boot process, availability of the second flash memory unit, and to carry out a measure in an event of un-availability of the second memory flash unit, and wherein the measure comprises downloading a basic software program for the second virtual machine into a reserved memory space within the first flash memory unit through a mobile radio interface of the motor vehicle.

* * * * *